(12) United States Patent
Nagatsu et al.

(10) Patent No.: US 9,850,828 B2
(45) Date of Patent: Dec. 26, 2017

(54) CONTROL DEVICE FOR COMPRESSION IGNITION-TYPE ENGINE (71) Applicant: MAZDA MOTOR CORPORATION, Hiroshima (JP)

(72) Inventors: Kazuhiro Nagatsu, Hiroshima (JP); Atsushi Inoue, Hiroshima (JP); Kota Matsumoto, Hiroshima (JP); Takashi Kaminaga, Hiroshima (JP); Toru Miyamoto, Higashihiroshima (JP); Takashi Youso, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 79 days.

(21) Appl. No.: 15/032,917

(22) PCT Filed: Oct. 23, 2014

(86) PCT No.: PCT/JP2014/005380
§ 371 (c)(1),
(2) Date: Apr. 28, 2016

(87) PCT Pub. No.: WO2015/064065
PCT Pub. Date: May 7, 2015

(65) Prior Publication Data
US 2016/0265482 A1 Sep. 15, 2016

(30) Foreign Application Priority Data
Oct. 29, 2013 (JP) .................................. 2013-224533

(51) Int. Cl.
F02D 21/06 (2006.01)
F02D 41/00 (2006.01)
(Continued)

(52) U.S. Cl.
CPC .......... *F02D 21/06* (2013.01); *F02B 29/0418* (2013.01); *F02D 13/0207* (2013.01);
(Continued)

(58) Field of Classification Search
CPC ..................... F02D 19/00; F02D 19/12; F02D 21/00–21/08; F02D 2021/083–2021/086;
(Continued)

(56) References Cited

U.S. PATENT DOCUMENTS 5,692,481 A * 12/1997 Miller .................... B01D 53/90
123/539
6,276,334 B1 8/2001 Flynn et al.
(Continued)

FOREIGN PATENT DOCUMENTS

DE 10124941 A1 12/2001
DE 69936081 T2 1/2008
(Continued)

OTHER PUBLICATIONS

International Search Report and Written Opinion issued in Application No. PCT/JP2014/005380, dated Dec. 9, 2014.

Primary Examiner — Erick Solis
Assistant Examiner — Robert Werner
(74) Attorney, Agent, or Firm — Studebaker & Brackett PC (57) ABSTRACT A control device for a compression ignition engine includes a controller configured to operate an engine body by compression ignition combustion when the engine body operates in a compression ignition range. When the engine body operates in a low load range with a load lower than a predetermined load in the compression ignition range, the controller sets a time of fuel injection with the fuel injection valve in a first half of a compression stroke or earlier, and allows the ozonator to introduce the ozone into the cylinder.

(Continued)

When the engine body operates in the low load range, the controller controls an ozone concentration to be lower at a higher speed than at a low speed.

7 Claims, 9 Drawing Sheets

(51) Int. Cl.
    *F02D 41/30*     (2006.01)
    *F02M 25/12*     (2006.01)
    *F02M 26/01*     (2016.01)
    *F02M 26/14*     (2016.01)
    *F02M 26/33*     (2016.01)
    *F02B 29/04*     (2006.01)
    *F02D 13/02*     (2006.01)
    *F02M 26/25*     (2016.01)
    *F02B 23/10*     (2006.01)
    *F02B 1/12*     (2006.01)

(52) U.S. Cl.
CPC ..... *F02D 13/0219* (2013.01); *F02D 13/0265* (2013.01); *F02D 41/006* (2013.01); *F02D 41/0057* (2013.01); *F02D 41/3035* (2013.01); *F02M 25/12* (2013.01); *F02M 26/01* (2016.02); *F02M 26/14* (2016.02); *F02M 26/25* (2016.02); *F02M 26/33* (2016.02); *F02B 1/12* (2013.01); *F02B 23/101* (2013.01); *F02B 29/0437* (2013.01); *F02B 2023/102* (2013.01); *F02D 41/0025* (2013.01); *F02D 41/0065* (2013.01); *F02D 2041/3052* (2013.01); *Y02T 10/128* (2013.01); *Y02T 10/146* (2013.01); *Y02T 10/18* (2013.01); *Y02T 10/47* (2013.01)

(58) Field of Classification Search
CPC ............. F02D 26/00; F02D 26/01; F02M 25/10–25/12; F02M 2700/4321; F02M 2026/001; F02M 2026/005
USPC ......... 123/536–537, 568.11, 568.14, 568.15, 123/568.21, 585; 701/108, 110
See application file for complete search history.

(56) References Cited

U.S. PATENT DOCUMENTS

| | | | |
|---|---|---|---|
| 6,345,610 | B1 | 2/2002 | Yang |
| 8,205,600 | B2* | 6/2012 | Hammer ................ F02M 25/12 123/539 |
| 9,546,613 | B2* | 1/2017 | Nagatsu .............. F02D 41/0057 |
| 9,719,441 | B2* | 8/2017 | Nagatsu .............. F02D 41/0057 |
| 2004/0221822 | A1* | 11/2004 | Silver ................... F02M 27/04 123/26 |
| 2006/0037567 | A1 | 2/2006 | Thomas |
| 2010/0294252 | A1* | 11/2010 | Katoh ................... F02M 25/10 123/568.11 |
| 2015/0083073 | A1* | 3/2015 | Nagatsu ............. F02D 41/3035 123/294 |

FOREIGN PATENT DOCUMENTS

| | | | |
|---|---|---|---|
| JP | 2002-276404 A | | 9/2002 |
| JP | 2002276404 A | * | 9/2002 |
| JP | 2002-309941 A | | 10/2002 |
| JP | 2009-197740 A | | 9/2009 |
| JP | 2013-194712 A | | 9/2013 |

* cited by examiner

CONTROL DEVICE FOR COMPRESSION IGNITION-TYPE ENGINE

TECHNICAL FIELD

The present invention relates to control devices for compression ignition engines.

BACKGROUND ART

For example, Patent Document 1 shows an engine performing compression ignition combustion when the engine operates in a predetermined low-speed low-load range. In the range for performing the compression ignition combustion, this engine provides a period of closing both of intake and exhaust valves (i.e., a negative overlap period) across an exhaust top dead center, thereby introducing part of exhaust gas into a cylinder (precisely, the part of exhaust gas is confined in the cylinder). Patent Document 1 also teaches controlling the closing time of the exhaust valve in accordance with the level of the engine load such that the lower the engine load is the more internal EGR gas is introduced into the cylinder. Since internal EGR gas has a relatively high temperature, the more internal EGR gas is introduced into the cylinder, the higher the compression start temperature and the compression end temperature become. This increases ignitionability in compression ignition and stability in the compression ignition combustion at a low engine load.

Patent Document 2 shows an engine performing compression ignition combustion of an air-fuel mixture in a cylinder when the engine operates in a predetermined low-speed low-load operation range. In the operation range for performing the compression ignition combustion, the engine introduces into the cylinder, ozone together with fresh air. Patent Document 2 also teaches that the lower the engine load is, the more the ozone is introduced into the cylinder, thereby increasing ignitionability in compression ignition and combustion stability.

CITATION LIST

Patent Document

[PATENT DOCUMENT 1] Japanese Unexamined Patent Publication No. 2009-197740
[PATENT DOCUMENT 2] Japanese Unexamined Patent Publication No. 2002-276404

SUMMARY OF THE INVENTION

Technical Problem

In the engine shown in Patent Document 2, the higher the engine speed is, the more the ozone is introduced. However, the higher the engine speed is, the higher the intake flow rate per unit time becomes. Thus, when more ozone is to be introduced at a high engine speed, the power consumption of the ozonator largely increases. This may cause deterioration in the fuel efficiency.

The technique disclosed herein was made in view of these respects. It is an object of the present disclosure to suppress an increase in power consumption due to ozone introduction in a compression ignition engine that performs compression ignition combustion within a predetermined range.

Solution to the Problem

The technique disclosed herein relates to a control device for a compression ignition engine. This control device for a compression ignition engine includes an engine body including a cylinder; a fuel injection valve configured to directly inject fuel into the cylinder; an ozonator configured to generate ozone to be introduced into the cylinder; and a controller configured to operate the engine body by compression ignition combustion of an air-fuel mixture in the cylinder when the engine body operates in a predetermined compression ignition range.

When the engine body operates in a low load range with a load lower than a predetermined load in the compression ignition range, the controller sets a time of fuel injection with the fuel injection valve in a first half of a compression stroke or earlier, and allows the ozonator to introduce the ozone into the cylinder. When the engine body operates in the low load range, the controller controls an ozone concentration to be lower at a higher speed than at a lower speed.

The "first half of a compression stroke" may be the first half where a compression stroke is divided into the first half and the second half in accordance with the progress at a crank angle. The "first half of the compression stroke or earlier" includes the first half of the compression stroke and an intake stroke.

The "low load range with a load lower than a predetermined load" is a load range in which the engine load is low and accordingly the state of temperature is low in the cylinder so that the ignitionability in the compression ignition and the combustion stability may deteriorate. The low load range requires any measure to ensure the ignitionability in the compression ignition and the combustion stability.

In the configuration described above, when the engine body operates in a low load range with a load lower than a predetermined load in the compression ignition range for performing the compression ignition combustion, the time of fuel injection with the fuel injection valve is set in the first half of the compression stroke or earlier. Relatively early fuel injection allows for forming a homogeneous air-fuel mixture, which is subject to the compression ignition combustion near the compression top dead center.

When the engine body operates in the low load range described above, the ozone generated by the ozonator is introduced into the cylinder. The "ozonator" may be provided, for example, on an intake passage, and add the ozone to fresh air introduced into the cylinder. The "ozonator" may also generate ozone in the cylinder utilizing the fresh air that has been introduced into the cylinder. Introduction of ozone into the cylinder improves the ignitionability in the compression ignition and the combustion stability even in the low load range.

In this manner, when the engine body operates at a higher speed in the low load range, the configuration described above controls the ozone concentration to be lower than that at a lower speed. The ozone concentration may vary continuously or gradually in accordance with the speed level of the engine body. For example, the low load range may be divided into a plurality of ranges according to the level of the engine speed, and the speed ranges may have respective ozone concentrations.

At a high speed of the engine body, a larger amount of heat is generated per unit time than at a low speed. Accordingly, the state of temperature in the cylinder becomes relatively high. Thus, the ignitionability in the compression ignition and the combustion stability improves more at a high speed than at a low speed. In the configuration described above, when the engine body operates at a higher speed, the ozone concentration is controlled to be lower than that at a lower speed. This ensures the ignitionability in the compression ignition and the combustion stability throughout the speed ranges when the engine body operates in the low load range. At a higher speed, since the ozone concentration is low, the power consumption of the ozonator is low.

The control device for a compression ignition engine may further include an internal EGR system configured to recirculate exhaust gas into the cylinder by controlling opening and closing of intake and exhaust valves of the engine body. When the engine body operates in the low load range, the controller may allow the internal EGR system to recirculate the exhaust gas into the cylinder, and set an EGR ratio, which is a ratio of an amount of the exhaust gas to an entire amount of gas in the cylinder to be lower than or equal to a predetermined value.

Since the internal EGR system substantially confines part of the exhaust gas in the cylinder, the temperature in the cylinder becomes relatively high at the start of compression, and accordingly, the compression end temperature becomes relatively high.

In the configuration described above, when the engine body operates in the low load range, the internal EGR system recirculates the exhaust gas into the cylinder, and thus the compression start temperature and the compression end temperature increase. This is advantageous in improving the ignitionability in the compression ignition and the combustion stability, and reduces the amount of ozone introduced into the cylinder. This is advantageous in reducing the power consumption of the ozonator.

The internal EGR system may adjust a closing time of at least the exhaust valve to provide a period of closing both the exhaust and intake valves across an exhaust top dead center, thereby recirculating the exhaust gas into the cylinder.

Specifically, the internal EGR system provides what is called a "negative overlap period" to confine part of the exhaust gas in the cylinder. In the negative overlap period, since the exhaust gas confined in the cylinder is compressed, the heat released through the wall surface of the cylinder causes a temperature drop at the start of compression. This temperature drop is significant to some extent when the engine body operates at a low speed. However, when the engine body operates at a high speed and an actual time per cycle is short, heat is hardly released, thereby hardly causing any temperature drop at the start of compression. That is, when the engine body operates at a high speed, a high temperature at the start of compression and an accordingly high compression end temperature ensure the ignitionability in the compression ignition and the combustion stability. This enables reduction in the ozone concentration. This is advantageous in reducing the power consumption of the ozonator.

The internal EGR system may be configured to recirculate the exhaust gas into the cylinder by opening the exhaust or intake valve while the intake or exhaust valve is open.

Specifically, the internal EGR system with this structure recirculates part of the exhaust gas into the cylinder by what is called "two-time opening of the exhaust valve" or "two-time opening of the intake valve." In the two-time opening of the exhaust valve, the internal EGR system opens the exhaust valve again while the intake valve is open so as to introduce into the cylinder again, part of the exhaust gas that has been discharged to an exhaust port during the exhaust stroke. In the two-time opening of the intake valve, the internal EGR system opens the intake valve again while the exhaust valve is open so as to discharge part of the exhaust gas to an intake port during the exhaust stroke and introduce the part of the exhaust gas into the cylinder together with fresh air during the intake stroke. Unlike the configuration with the negative overlap period, this two-time opening of the exhaust or intake valve does not compress the exhaust gas during the exhaust stroke not to prevent cooling losses from increasing. This results in a relative temperature rise at the start of compression. This increases the compression end temperature and is advantageous in improving the ignitionability in the compression ignition and the combustion stability. This also enables reduction in the ozone concentration and the power consumption of the ozonator.

The control device for a compression ignition engine may further include an external EGR system configured to recirculate the exhaust gas with a temperature lower than that of the internal EGR system into the cylinder via an EGR passage connecting exhaust and intake passages of the engine body. When the engine body operates in a high load range with a load higher than or equal to the predetermined load in the compression ignition range, the controller may allow at least the external EGR system to recirculate lower temperature exhaust gas into the cylinder.

When the engine body operates in the high load range with the load higher than or equal to the predetermined range in the compression ignition range, the load of the engine body is relatively high, and accordingly the state of temperature in the cylinder is high. This sufficiently ensures the ignitionability in the compression ignition and the combustion stability without introducing ozone into the cylinder. If the state of temperature in the cylinder is too high, a rapid pressure rise (i.e., dP/dt) occurs in the cylinder in accordance with the compression ignition combustion, thereby causing combustion noise.

In the configuration described above, when the engine body operates in the high load range, at least the external EGR system recirculates the exhaust gas with a temperature lower than that of the internal EGR system into the cylinder. This suppresses an excessive increase in the state of temperature in the cylinder, and rapid pressure rise in the cylinder according to the compression ignition combustion. In short, combustion noise decreases.

Advantages of the Invention

As described above, when the engine body operates in a low load range of a compression ignition range, the control device for a compression ignition engine controls the ozone concentration to be lower at a higher speed than at a lower speed to ensure the ignitionability in the compression ignition and the combustion stability throughout the speed ranges, and reduce the power consumption of the ozonator.

DESCRIPTION OF EMBODIMENTS

Figure 1:
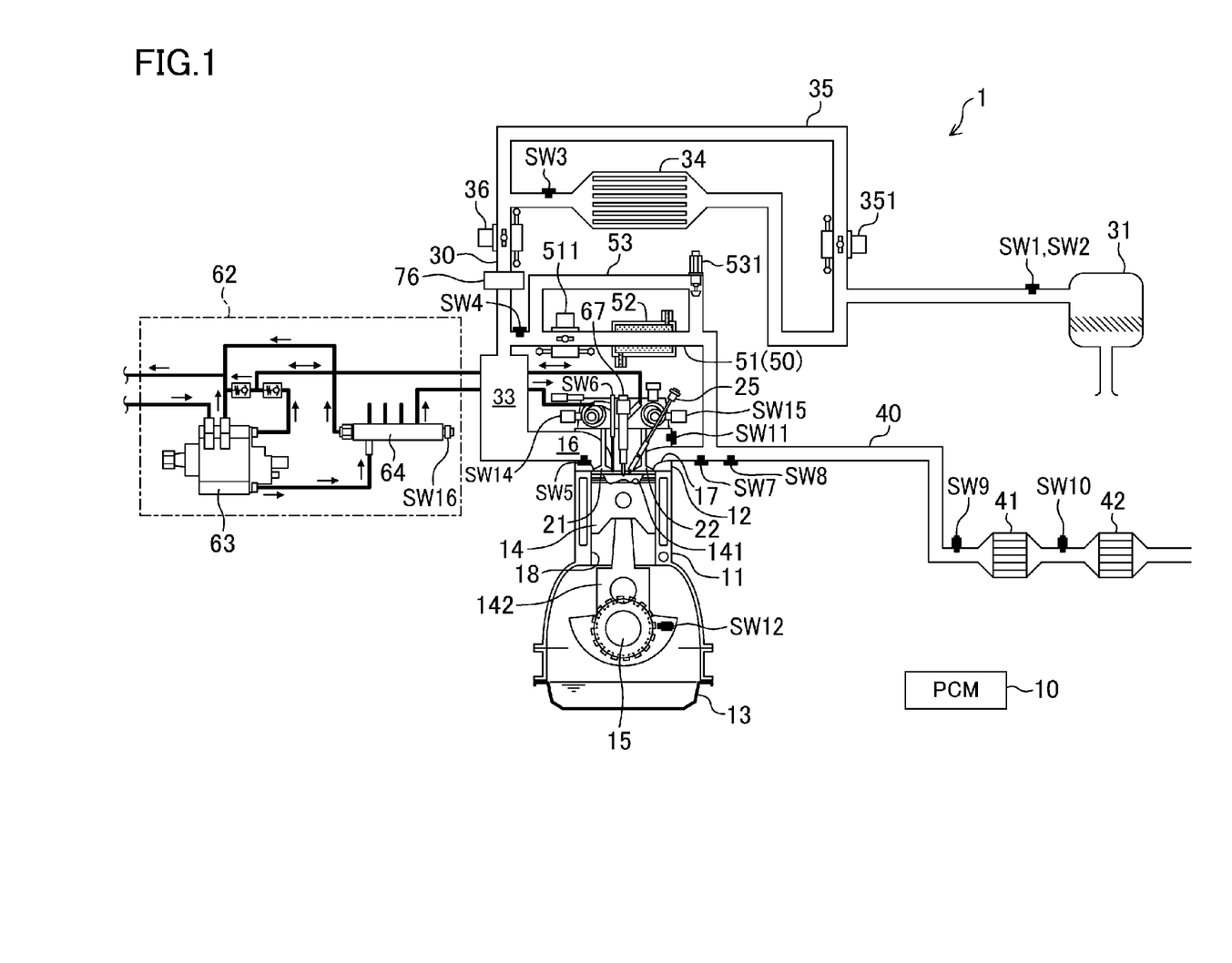
FIG. 1 is a schematic view illustrating the structure of a compression ignition engine.
Figure 2:
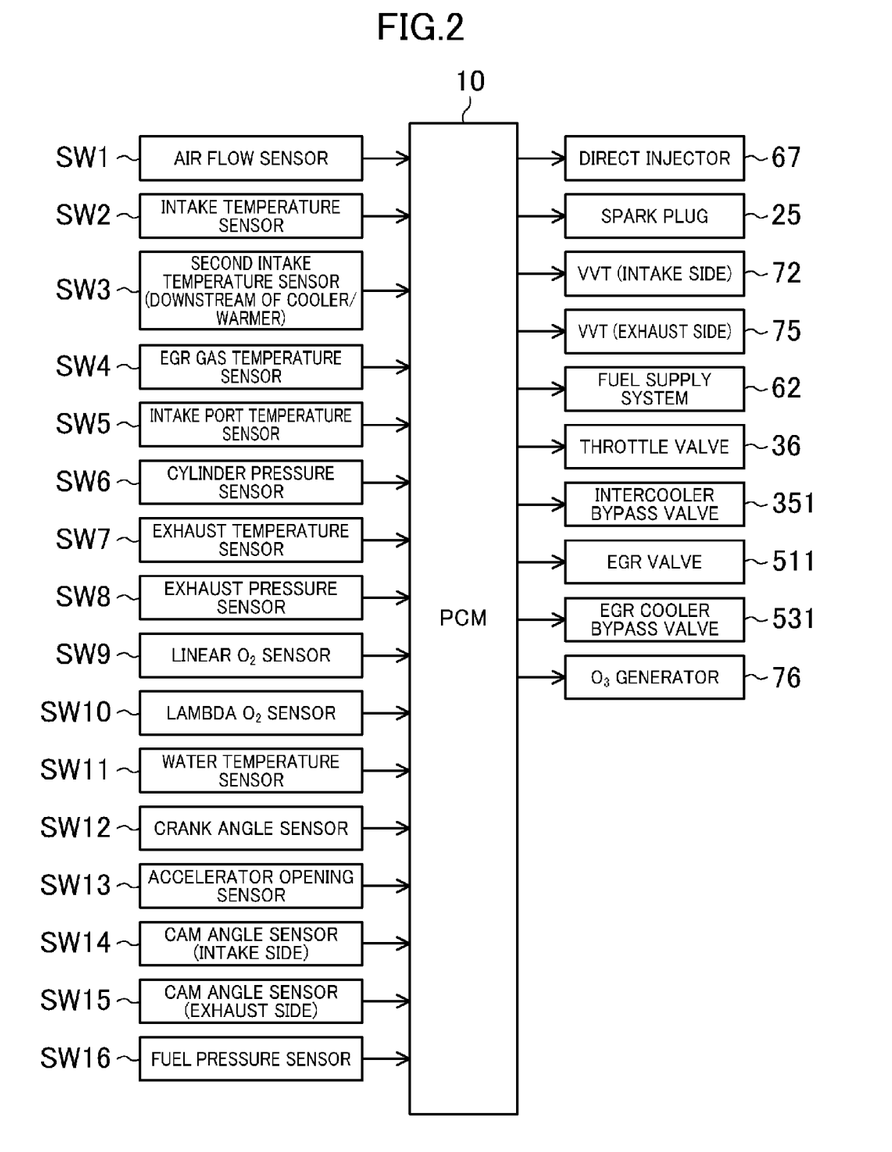
FIG. 2 is a block diagram illustrating the control of the compression ignition engine.
Figure 3:
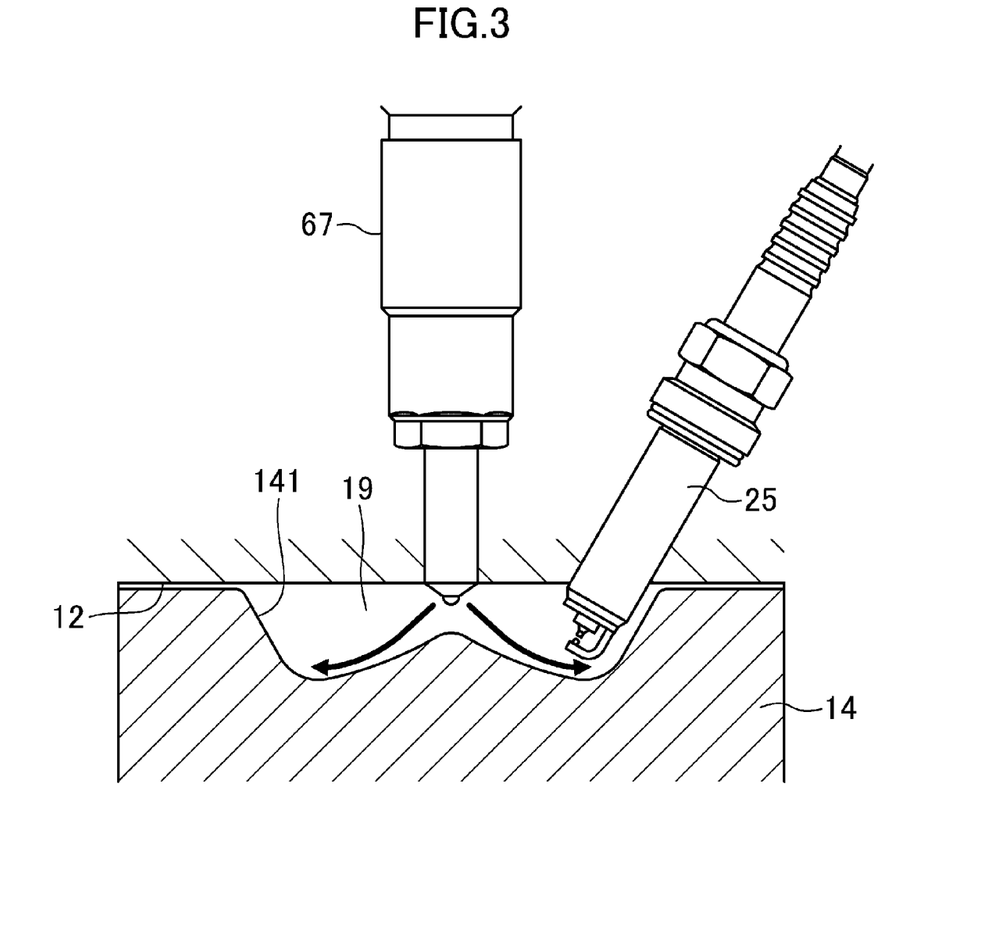
FIG. 3 is an enlarged cross-sectional view of a combustion chamber.

Embodiments of a control device for a compression ignition engine will now be described with reference to the drawings. The following preferred embodiments are mere examples. FIGS. 1 and 2 illustrate the schematic structure of an engine (i.e., an engine body) 1. The engine 1 is a spark ignition gasoline engine mounted in a vehicle and supplied with fuel containing at least gasoline. The engine 1 includes a cylinder block 11 provided with a plurality of cylinders 18 (although FIG. 1 shows only one cylinder, for example, four cylinders are arranged in a straight row), a cylinder head 12 disposed on the cylinder block 11, and an oil pan 13 disposed under the cylinder block 11 and storing lubricant. A piston 14 is fitted in each of the cylinders 18 to reciprocate. The piston 14 is connected to a crankshaft 15 via a con rod 142. A cavity 141 like a re-entrant cavity of a diesel engine is formed at the top of the piston 14, as shown in FIG. 3 enlarged. The cavity 141 faces an injector 67, which will be described later, when the piston 14 is near the compression top dead center. The cylinder head 12, the cylinder 18, and the piston 14 having the cavity 141 define a combustion chamber 19. The combustion chamber 19 is not limited to the form shown in the figure. The form of the cavity 141, the form of the top of the piston 14, the form of the ceiling of the combustion chamber 19, and other forms may be changed as appropriate.

This engine 1 has a relatively high geometrical compression ratio of 15 or higher to improve theoretical thermal efficiency, stabilize compression ignition combustion, which will be described later, for example. The geometrical compression ratio may be set as appropriate within the range from about 15 to about 20, both inclusive.

The cylinder head 12 has an intake port 16 and an exhaust port 17 for each cylinder 18. The intake port 16 and the exhaust port 17 are provided with an intake valve 21 and an exhaust valve 22, respectively, which open and close the openings at the combustion chamber 19.

Out of valve systems driving the intake valve 21 and the exhaust valve 22, an exhaust valve system has, a phase variable mechanism (hereinafter referred to as a variable valve timing (VVT) mechanism) 75 capable of changing the rotation phase of an exhaust camshaft relative to the crankshaft 15. The VVT 75 may have a known hydraulic, electromagnetic, or mechanical structure as appropriate, and the detailed structure is not shown in the figure. The opening and closing times of the exhaust valve 22 are continuously changeable within a predetermined range using the VVT 75.

Like the exhaust valve system including the VVT 75, the intake valve system includes a VVT 72, as shown in FIG. 2. Like the exhaust VVT 75, the intake VVT 72 may have a known hydraulic, electromagnetic, or mechanical structure as appropriate, and the detailed structure is not shown in the figure. The opening and closing times of the intake valve 21 are continuously changeable within a predetermined range using the VVT 72.

Although will be described later, the opening times of the intake and exhaust valves 21 and 22 are changed in accordance with the operation of the engine. In particular, at the control of the internal EGR, a negative overlap period of closing both of the intake and exhaust valves 21 and 22 may be provided in exhaust and intake strokes to retain part of burnt gas in the cylinder 18.

The cylinder head 12 is provided with the (direct) injector 67, which directly injects the fuel into each of the cylinders 18. As shown in FIG. 3 enlarged, the injector 67 is disposed with its nozzle extending from the center of the ceiling of the combustion chamber 19 toward the inside of the combustion chamber 19. The injector 67 directly injects, into the combustion chamber 19, the fuel of the amount corresponding to the operating mode of the engine 1 at the injection timing corresponding to the operating mode of the engine 1. In this example, although not shown in detail, the injector 67 is a multi-hole injector with a plurality of nozzles. This structure allows the injector 67 to inject the fuel to radially spread fuel spray from the center of the combustion chamber 19. As indicated by the arrows of FIG. 3, the fuel spray, which is injected to radially spread from the center of the combustion chamber 19 when the piston 14 is near the compression top dead center, flows along the wall of the cavity 141 formed in the top of the piston. In other words, the cavity 141 is formed to house the fuel spray, which is injected when the piston 14 is near the compression top dead center. This combination of the multi-hole injector 67 and the cavity 141 is advantageous in shortening the mixture formation period after the fuel injection, and shortening a combustion period. The injector 67 is not limited to the multi-hole injector, but may have an outward opening valve.

A fuel tank (not shown) is connected to the injector 67 by a fuel supply passage. The fuel supply passage is provided with a fuel supply system 62 including a fuel pump 63 and a common rail 64, and capable of supplying the fuel to the injector 67 at a relatively high fuel pressure. The fuel pump 63 pumps the fuel from the fuel tank to the common rail 64. The common rail 64 stores the pumped fuel at a relatively high fuel pressure. The valve of the injector 67 is open, thereby injecting the fuel stored in the common rail 64 from the nozzle of the injector 67. Although not shown, the fuel pump 63 is a plunger pump, which is driven by the engine 1. The fuel supply system 62 including the pump, which is driven by the engine, supplies fuel of a high pressure of 30 MPa or higher to the injector 67. The fuel pressure may be about 120 MPa at maximum. As will be described later, the pressure of the fuel supplied to the injector 67 changes in accordance with the operating mode of the engine 1. The fuel supply system 62 is not limited to this structure.

As shown in FIG. 3, a spark plug 25 igniting an air-fuel mixture in the combustion chamber 19 is attached to the cylinder head 12. In this example, the spark plug 25 extends obliquely downward from the exhaust side of the engine 1 and penetrates the cylinder head 12. As shown in FIG. 3, the tip of the spark plug 25 faces the inside of the cavity 141 of the piston 14 located in the compression top dead center.

As shown in FIG. 1, an intake passage 30 is connected to one side surface of the engine 1 to communicate with the intake port 16 of each cylinder 18. On the other hand, an exhaust passage 40, which exhausts the burnt gas (i.e., exhaust gas) from the combustion chamber 19 of each cylinder 18, is connected to the other side surface of the engine 1.

An air cleaner 31 filtering intake air is disposed at the upstream end of the intake passage 30. A surge tank 33 is disposed near the downstream end of the intake passage 30. The intake passage 30 is divided, downstream of the surge tank 33, into independent passages for the respective cylinders 18. The downstream end of each independent passage is connected to the intake port 16 of the associated one of the cylinders 18.

A water-cooling intercooler/warmer 34 cooling or heating the air, and a throttle valve 36 adjusting the amount of the air taken into each cylinder 18 are disposed in the intake passage 30 between the air cleaner 31 and the surge tank 33. The intake passage 30 is also connected to an intercooler bypass passage 35 bypassing the intercooler/warmer 34. This intercooler bypass passage 35 is provided with an intercooler bypass valve 351 for adjusting the flow rate of the air passing through the passage 35. The opening degree of the intercooler bypass valve 351 is adjusted to adjust the ratio of the flow rate of the intercooler bypass passage 35 to the flow rate of the intercooler/warmer 34, thereby adjusting the temperature of fresh air introduced into the cylinder 18. The intercooler/warmer 34 and its attachment may be omitted.

The upstream of the exhaust passage 40 is an exhaust manifold including the independent passages divided for the respective cylinders 18 and connected to the outside ends of the exhaust ports 17, and a collector collecting of the independent passages. A direct catalyst container 41 and an underfoot catalyst container 42 are provided as exhaust purifiers, which purify harmful components in the exhaust gas, downstream of the exhaust manifold in the exhaust passage 40. Each of the direct catalyst container 41 and the underfoot catalyst container 42 includes a tubular case, and, for example, a three-way catalyst in the passage inside the case. This engine 1 contains no $NO_x$ purification catalyst.

The portion of the intake passage 30 between the surge tank 33 and the throttle valve 36 is connected to the upstream of the direct catalyst container 41 in the exhaust passage 40 via an EGR passage 50 for recirculating part of the exhaust gas in the intake passage 30. This EGR passage 50 includes a main passage 51 provided with an EGR cooler 52 for cooling the exhaust gas with engine cooling water, and an EGR cooler bypass passage 53 for bypassing the EGR cooler 52. The main passage 51 is provided with an EGR valve 511 for adjusting the amount of the exhaust gas to be recirculated to the intake passage 30. The EGR cooler bypass passage 53 is provided with an EGR cooler bypass valve 531 for adjusting the flow rate of the exhaust gas circulating through the EGR cooler bypass passage 53.

Figure 4:
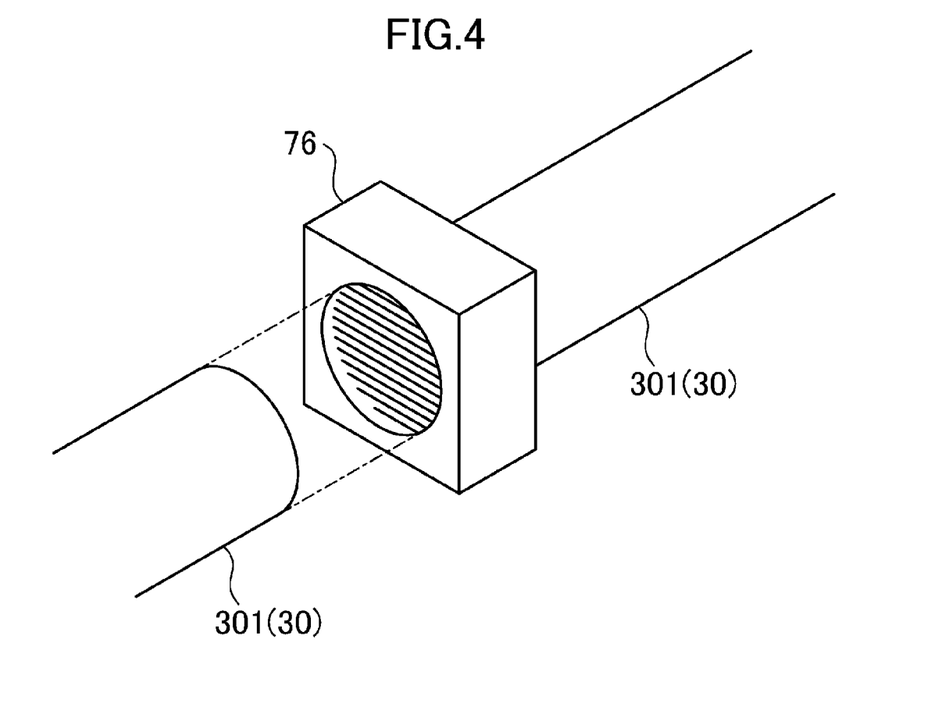
FIG. 4 is a schematic view illustrating the structure of an ozonator.

An ozonator ($O_3$ generator) 76 is interposed between the throttle valve 36 and the surge tank 33 in the intake passage 30, and adds ozone to fresh air to be introduced to the cylinder 18. As shown in FIG. 4, for example, the ozonator 76 includes a plurality of electrodes horizontally or vertically arranged in parallel at predetermined intervals in the cross-section of an intake pipe 301. The ozonator 76 generates ozone by silent discharge using, as a material gas, oxygen contained in intake air. That is, a power supply (not shown) applies a high radiofrequency AC voltage to the electrodes to generate silent discharge in a discharge gap and ozonize air (i.e., intake air) passing through the discharge gap. The intake air added with the ozone in this manner is introduced from the surge tank 33 via the intake manifold into each cylinder 18. By changing the type of voltage application to the electrodes of the ozonator 76 and/or the number of the electrodes applying a voltage, the ozone concentration in the intake air after having passed through the ozonator 76 is controlled. As will be described later, a PCM 10 controls the ozone concentration of the intake air introduced into the cylinder 18 by controlling the ozonator 76.

The engine 1 is controlled by a powertrain control module (hereinafter referred to as a PCM) 10. The PCM 10 is a microprocessor including a CPU, a memory, a counter timer group, an interface, and paths connecting these units. The PCM 10 is a controller.

As shown in FIGS. 1 and 2, detection signals of various sensors SW1-SW16 are input to the PCM 10. The various sensors include the following. An airflow sensor SW1 detects the flow rate of the fresh air downstream of the air cleaner 31. An intake temperature sensor SW2 detects the temperature of the fresh air. A second intake temperature sensor SW3 is disposed downstream of the intercooler/warmer 34, and detects the temperature of the fresh air after passing through the intercooler/warmer 34. An EGR gas temperature sensor SW4 is disposed near the portion of the EGR passage 50 connected to the intake passage 30, and detects the temperature of external EGR gas. An intake port temperature sensor SW5 is attached to the intake port 16, and detects the temperature of intake air immediately before flowing into the cylinder 18. A cylinder pressure sensor SW6 is attached to the cylinder head 12, and detects the pressure inside the cylinder 18. An exhaust temperature sensor SW7 and an exhaust pressure sensor SW8 are disposed near the portion of the exhaust passage 40 connected to the EGR passage 50, and detect the temperature and pressure of the exhaust gas, respectively. A linear $O_2$ sensor SW9 is disposed upstream of the direct catalyst container 41, and detects the concentration of oxygen in the exhaust gas. A lambda $O_2$ sensor SW10 is disposed between the direct catalyst container 41 and the underfoot catalyst container 42, and detects the concentration of oxygen in the exhaust gas. A water temperature sensor SW11 detects the temperature of the engine cooling water. A crank angle sensor SW12 detects the rotation angle of the crankshaft 15. An accelerator opening sensor SW13 detects the opening degree of the accelerator corresponding to the amount of operation of an accelerator pedal (not shown) of the vehicle. Intake and exhaust cam angle sensors SW14 and SW15 are provided. A fuel pressure sensor SW16 is attached to the common rail 64 of the fuel supply system 62, and detects the pressure of the fuel supplied to the injector 67.

The PCM 10 performs various types of calculation based on these detection signals to determine the states of the engine 1 and the vehicle. In accordance with the determination result, the PCM 10 outputs control signals to the actuators of the injector 67, the spark plug 25, the intake VVT 72, the exhaust VVL 75, the fuel supply system 62, the various valves (e.g., the throttle valve 36, the intercooler bypass valve 351, the EGR valve 511, and the EGR cooler bypass valve 531), and the ozonator 76. As such, the PCM 10 operates the engine 1.

Figure 5:
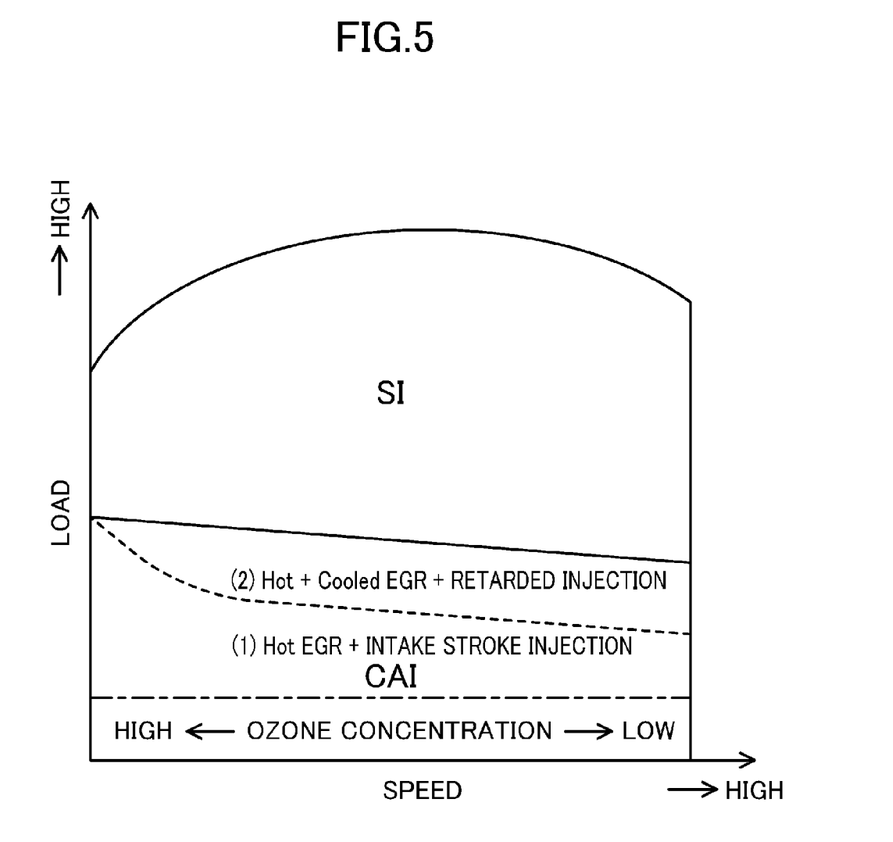
FIG. 5 is an example operation control map of an engine.

FIG. 5 illustrates an example operation control map of the engine 1. This engine 1 aims to improve the fuel efficiency and the exhaust emission. Within a relatively low load range of the engine, ignition with the spark plug 25 is not performed but compression ignition combustion is performed, which burns the fuel by compression auto-ignition (i.e., controlled auto-ignition combustion). In the example of FIG. 5, the range with a load lower than a combustion switching load, which is indicated by the solid line, corresponds to a compression ignition range for performing compression ignition. However, with an increase in the engine load 1, the compression ignition combustion becomes rapid to cause problems such as combustion noise. Thus, within a relatively high load range of the engine, this engine 1 stops the compression ignition combustion, and starts the forced ignition combustion (spark ignition combustion here) with the spark plug 25. In the example of FIG. 5, the range with a load higher than or equal to the combustion switching load, which is indicated by the solid line, corresponds to a spark ignition range. As such, the engine 1 is switched between a controlled auto ignition (CAI) mode performing the compression ignition combustion, and a spark ignition (SI) mode performing the spark ignition combustion in accordance with the operating mode of the engine 1, particularly in accordance with the load of the engine 1. The boundary between the modes is not limited to what is shown in the figure.

Figure 6A:
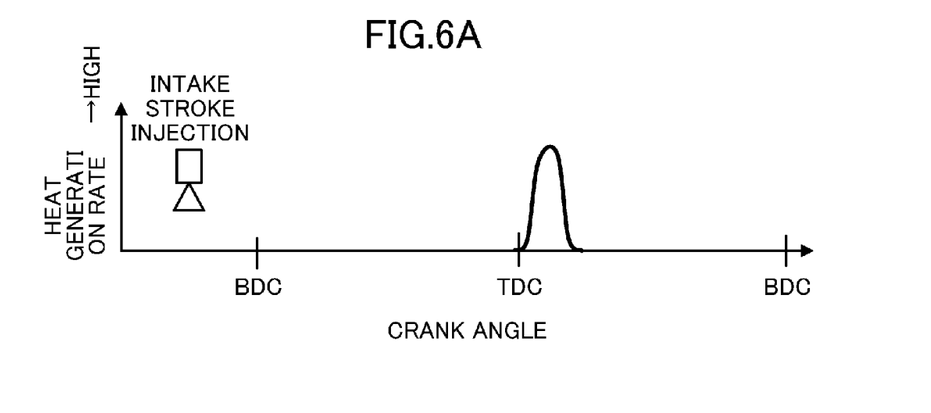
FIG. 6A illustrates an example time of fuel injection in performing intake stroke injection in a CAI mode, and a heat generation rate in CAI combustion according thereto.

The CAI mode is divided into two ranges in accordance with the level of the engine load. Specifically, in the low and middle load range (1) of the CAI mode, hot EGR gas of a relatively high temperature is introduced into the cylinder 18 to improve the ignitionability and the stability in the compression ignition combustion. This is to provide, as described above, the negative overlap period of closing both the exhaust valve 22 and the intake valve 21 including the compression top dead center. The introduction of the hot EGR gas increases the compression end temperature in the cylinder 18, and is advantageous in improving the ignitionability and the stability in the compression ignition combustion in the range (1). In the range (1), as shown in FIG. 6A, the injector 67 injects the fuel into the cylinder 18 at least within the period between the intake stroke and the middle of the compression stroke to form a homogeneous air-fuel mixture. As shown in FIG. 6A, the homogeneous air-fuel mixture is subject to the compression auto-ignition near the compression top dead center.

In the high load range (2) of the CAI mode including the boundary between the CAI mode and the SI mode (i.e., the switching load), the temperature in the cylinder 18 becomes higher. Thus, in order to suppress preignition, the amount of hot EGR gas is reduced, and the EGR gas cooled while passing through the EGR cooler 52 is introduced into the cylinder 18.

Figure 6B:
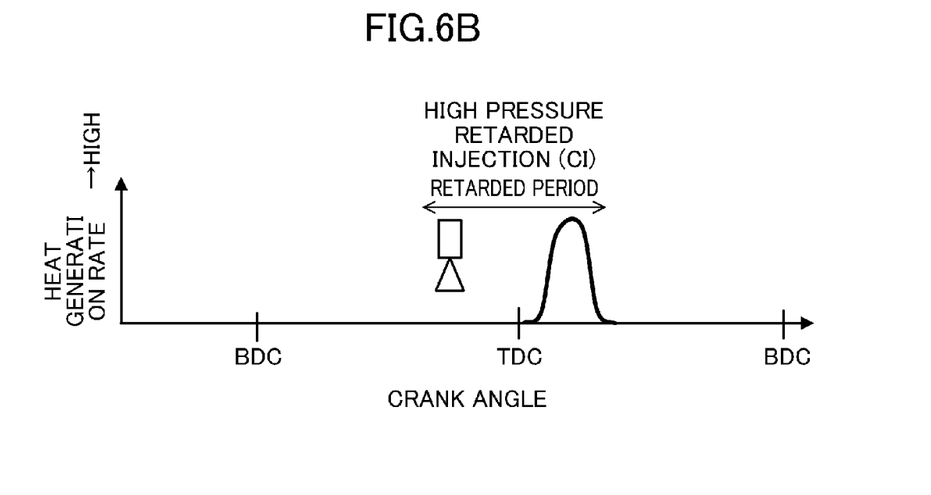
FIG. 6B illustrates an example time of fuel injection in performing high pressure retarded injection in the CAI mode, and the heat generation rate in the CAI combustion according thereto.

This engine 1 sets the switching load as high as possible to extend the range of the CAI mode toward the higher load as much as possible. In the high load range (2), when the fuel is injected into the cylinder 18 within the period between the intake stroke and the middle of the compression stroke, abnormal combustion such as preignition occurs. On the other hand, if a large amount of the cooled EGR gas of the low temperature is introduced to lower the compression end temperature in the cylinder, the ignitionability in the compression ignition deteriorates. That is, in the range (2), the compression ignition combustion is not stably performed simply by controlling the temperature in the cylinder 18. In this range (2), creative fuel injection is used in addition to the control of the temperature in the cylinder 18 to reduce abnormal combustion such as preignition and stabilize the compression ignition combustion. Specifically, in this fuel injection, the fuel is injected into the cylinder 18 at a fuel pressure much higher than the conventional techniques at least within the period between the terminal stage of the compression stroke and the initial stage of the expansion stroke (the period is hereinafter referred to as a "retarded period") as shown in FIG. 6B. This characteristic fuel injection is hereinafter referred to as "high pressure retarded injection" or simply "retarded injection." This high pressure retarded injection reduces abnormal combustion in the range (2) and stabilizes the compression ignition combustion. The details of the high pressure retarded injection will be described later.

Contrary to this CAI mode, although not shown in FIG. 5, the SI mode stops introduction of the hot EGR gas, and continues introduction of the cooled EGR gas. In the SI mode, although will be described later in detail, the throttle valve 36 is fully open, and the opening degree of the EGR valve 511 is adjusted to adjust the amount of the fresh air introduced to the cylinder 18, and the amount of the external EGR gas. The adjustment of the ratio of the gas introduced into the cylinder 18 reduces pump losses. A large amount of the cooled EGR gas is introduced into the cylinder 18 to reduce abnormal combustion and to keep the low combustion temperature of the spark ignition combustion, thereby reducing generation of Raw NOx and cooling losses. In the full load range, the EGR valve 511 is closed to reduce the external EGR to zero.

As described above, the geometrical compression ratio of the engine 1 is set to 15 or higher (e.g., 18). The high compression ratio increases the compression end temperature and the compression end pressure, and is thus advantageous in stabilizing the compression ignition combustion particularly in the low load range (e.g., the range (1)) of the CAI mode. On the other hand, the engine 1 with the high compression ratio is subject to abnormal combustion such as preignition and knocking in the SI mode of the high load.

To address this problem, the engine 1 performs the above-described high pressure retarded injection in the SI mode to reduce abnormal combustion. More specifically, the engine 1 performs the high pressure retarded injection which injects the fuel into the cylinder 18 within the retarded period between the terminal stage of the compression stroke and the initial stage of the expansion stroke at the high fuel pressure of 30 MPa or higher. In the SI mode, in addition to the high pressure retarded injection within the retarded period, part of the fuel to be injected may be injected into the cylinder 18 within the intake stroke, in which the intake valve 21 is open (i.e., the divided injection is performed).

High pressure retarded injection in an SI mode will be briefly described. For example, as described in detail in Japanese Patent Application No. 2011-38810 (Japanese Unexamined Patent Publication No. 2012-172665), which is an Applicant's previous application, the high pressure retarded injection aims to shorten the reactive time between the start of the fuel injection and the end of the combustion, thereby reducing abnormal combustion. Specifically, the reactive time is the sum of the period when the injector 67 injects the fuel (i.e., (1) an injection period), the period until a burnable air-fuel mixture is formed around the spark plug 25 after the end of the injection (i.e., (2) an air-fuel mixture formation period), and the period until the combustion started by the ignition ends (i.e., (3) a combustion period), that is, (1)+(2)+(3). In the high pressure retarded injection, the fuel is injected at high pressure into the cylinder 18 to shorten the injection period and the mixture formation period. Shortening the injection period and the mixture formation period relatively retards the time of the fuel injection, more precisely, the start of the injection. In the high pressure retarded injection, the fuel is injected in the retarded period between the terminal stage of the compression stroke and the initial stage of the expansion stroke.

The fuel is injected into the cylinder 18 at the high fuel pressure, thereby increasing turbulence in the cylinder to increase the turbulence energy in the cylinder 18. This and relatively retarding the time of the fuel injection allow for performing spark ignition and start combustion, while maintaining the high turbulence energy. This shortens the combustion period.

As such, the high pressure retarded injection shortens all of the injection period, the mixture formation period, and the combustion period. As a result, the reactive time of the unburnt air-fuel mixture is largely shortened as compared to the conventional fuel injection in the intake stroke. As a result of shortening the reactive time, the reactivity of the unburnt air-fuel mixture is retarded at the end of the combustion, thereby reducing the abnormal combustion.

The combustion period is efficiently shortened by setting the fuel pressure to, for example, 30 MPa or higher. The fuel pressure of 30 MPa or higher effectively shortens both of the injection period and the mixture formation period. The fuel pressure is preferably set as appropriate in accordance with the characteristics of the fuel to be used, which contains at least gasoline. The upper limit may be, for example, 120 MPa.

The high pressure retarded injection employs creative injection of the fuel into the cylinder 18 to reduce abnormal combustion in the SI mode. Different from this injection, retarding the ignition time to reduce abnormal combustion is conventionally known. Retarding the ignition time reduces thermal efficiency and the torque. In performing the high pressure retarded injection, the creative fuel injection reduces abnormal combustion to advance the ignition time. This improves thermal efficiency and the torque. That is, the high pressure retarded injection not only reduces the abnormal combustion, but also advances the ignition time by the time corresponding to the reduction. This is advantageous in improving the fuel efficiency.

As described above, the high pressure retarded injection in the SI mode shortens all of the injection period, the mixture formation period, and the combustion period. The high pressure retarded injection in the range (2) of the CAI mode shortens the injection period, and the mixture formation period. Specifically, the fuel is injected into the cylinder 18 at the high fuel pressure, thereby increasing the turbulence in the cylinder to improve the mixing performance of the atomized fuel. As a result, a relatively homogeneous air-fuel mixture is formed rapidly even if the fuel is injected at a late time near the compression top dead center. The high pressure retarded injection in the CAI mode controls the start of reaction of the unburnt air-fuel mixture.

In the high pressure retarded injection in the CAI mode, the fuel is injected at a late time near the compression top dead center in the relatively high load range to reduce preignition, in the compression stroke in which no fuel is injected into the cylinder 18, and to rapidly form the roughly homogenous air-fuel mixture as described above. Thus, reliable compression ignition is possible after the compression top dead center. In the expansion stroke, in which motoring gradually reduces the pressure in the cylinder 18, the compression ignition combustion becomes slowly to reduce a rapid pressure rise (dP/dt) in the cylinder 18 according to the compression ignition combustion. This removes NVH constraints, resulting in expansion of the range of the CAI mode to the higher load.

Figure 7:
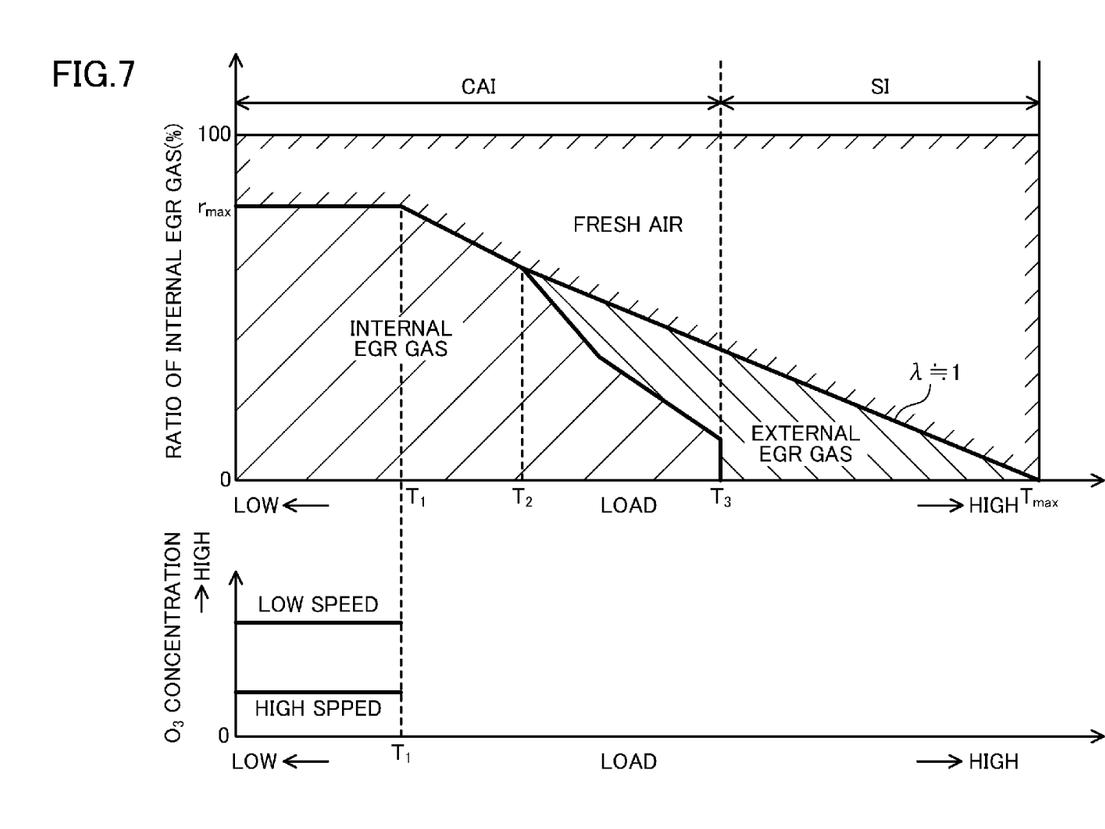
FIG. 7 illustrates an example relationship between the level of an engine load and an EGR ratio, and between the level of the engine load and the concentration of ozone introduced into a cylinder.

FIG. 7 illustrates changes in the EGR ratio according to the load level of the engine 1 (i.e., changes in the gas composition in the cylinder 18). Now, the changes in the EGR ratio will be sequentially described from the high-load range to the low-load range.

From Maximum Load $T_{max}$ to Switching Load $T_3$

The higher load range than the switching load $T_3$ corresponds to the SI mode. As described above, in this SI range, only the cooled EGR gas is introduced into the cylinder 18. Specifically, the opening degree of the throttle valve 36 is maintained at the full-open. While being closed in the full load range, the EGR valve 511 is gradually opened in accordance with a decrease in the engine load. In the SI mode, the EGR ratio is set to the maximum under the condition where the air-fuel ratio of the mixture is the stoichiometric air-fuel ratio ($\lambda \approx 1$). This is advantageous in reducing pump losses. Setting the air-fuel ratio of the mixture to the stoichiometric air-fuel ratio enables utilization of a three-way catalyst. Since the amount of injected fuel decreases with a decrease in the engine load, the EGR ratio continuously increases. This continuously changes the gas composition in the cylinder 18 when the engine load continuously changes, and is thus advantageous in improving the controllability.

From Switching load $T_3$ to Specified Load $T_1$

As described above, the switching load $T_3$ corresponds to the switching between the CAI mode and the SI mode. In the lower load range less than or equal to the switching load $T_3$, the engine operates in the CAI mode. In each of the lower load range and the higher load range, which includes the switching load $T_3$ between the CAI mode and the SI mode, the air-fuel ratio of the mixture is set to the stoichiometric air-fuel ratio ($\lambda \approx 1$). Thus, the EGR ratio continuously increases from the CAI mode to the SI mode. This causes no change in the transition from the CI mode to the SI mode, in which the combustion type is switched, except for execution/non-execution of the spark ignition, and smoothens the switching from the CAI mode to the SI mode or vice versa to reduce torque shock, etc.

In the range next to the switching load $T_3$ at a lower load, a relatively large amount of the EGR gas (the cooled EGR gas) is introduced into the cylinder 18 continuously from the range next to the switching load $T_3$ at a higher load. At the same time, the high pressure retarded injection injecting the fuel at the fuel pressure of 30 MPa or higher near the compression top dead center is performed to execute the compression ignition combustion. This allows for making the compression ignition combustion slow, thereby removing the dP/dt constraints, and stably performing the compression ignition combustion in a relatively high load range of the engine 1 as the range performing the compression ignition combustion.

In the CAI mode, the negative overlap period is provided to introduce the internal EGR gas (i.e., the hot EGR gas) into the cylinder 18. The EGR ratio, which is the sum of the hot EGR gas and the cooled EGR gas continuously increases with a decrease in the load of the engine 1. The ratios of the cooled EGR gas and the hot EGR gas gradually decreases and increases, respectively, with a decrease in the load of the engine 1. The amount of the introduced cooled EGR gas is adjusted by controlling the opening degree of the EGR valve 511. On the other hand, the amount of the introduced hot EGR gas is adjusted by adjusting the period of closing the exhaust valve 22.

In the predetermined load $T_2$ between the switching load $T_3$ and the specified load $T_1$, the introduction of the cooled EGR gas is stopped. When the load of the engine 1 is lower than the predetermined load $T_2$, only the hot EGR gas is introduced into the cylinder 18. Increasing the amount of the introduced hot EGR gas with a decrease in the load of the engine 1 increases the gas temperature in the cylinder before the start of compression. This increases the compression end temperature, and is advantageous in improving the ignitionability in the compression ignition and the stability in the compression ignition combustion in the range in which the load of the engine 1 is low.

The EGR ratio, which continuously increases with a decrease in the load of the engine 1, is set to the maximum EGR ratio $r_{max}$ in the specified load $T_1$.

Between Specified Load T1 and Minimum Load

To the specified load T1, as described above, the EGR ratio is set continuously higher with a decrease in the load of the engine 1. When the load of the engine 1 is lower than the specified load T1, the EGR ratio is fixed to the maximum EGR ratio $r_{max}$ regardless of the load level of the engine 1.

The EGR ratio is set less than the maximum EGR ratio $r_{max}$. This is because, if the EGR ratio is increased to introduce a large amount of exhaust gas into the cylinder 18, the specific heat ratio of the gas in the cylinder 18 decreases. This rather lowers the compression end temperature even if the gas temperature is high before the start of compression.

Exhaust gas contains much of $CO_2$ and $H_2O$, which are triatomic molecules, and has a higher specific heat ratio than that of air containing nitrogen ($N_2$) and oxygen ($O_2$). Thus, when the EGR ratio is increased to introduce a larger amount of exhaust gas into the cylinder 18, the specific heat ratio of the gas in the cylinder 18 decreases.

Exhaust gas has a higher temperature than fresh air. With an increase in the EGR ratio, the temperature in the cylinder at the start of compression increases. However, the specific heat ratio of the gas decreases with an increase in the EGR ratio, the temperature of the gas does not increase so much even after the gas is compressed. As a result, the compression end temperature is the maximum at the predetermined EGR ratio $r_{max}$, and then lowers even if the EGR ratio increases.

In this engine 1, the compression end temperature is highest at the maximum EGR ratio $r_{max}$. When the load of the engine 1 is lower than the specified load $T_1$, the EGR ratio is set to the maximum EGR ratio $r_{max}$, to reduce a decrease in the compression end temperature. This maximum EGR ratio $r_{max}$ may be set within the range between 50% and 90%. The maximum EGR ratio $r_{max}$ may be set as high as possible as long as a high compression end temperature is obtained, and preferably be set within the range between 70% and 90%. The engine 1 has a high geometrical compression ratio of 15 or higher to obtain a high compression end temperature. If the engine 1 is configured to obtain an as high as possible compression end temperature, the maximum EGR ratio $r_{max}$ may be set, for example, about 80%. Setting the maximum EGR ratio $r_{max}$ as high as possible is advantageous in reducing unburnt fuel loss of the engine 1. When the engine 1 has a low load, the unburnt fuel loss tends to increase. Setting the EGR ratio as high as possible when the load of the engine 1 is lower than the specified load $T_1$ is advantageous in improving the fuel efficiency due to the reduction in the unburnt fuel loss.

In this manner, in the engine 1, even when the load of the engine 1 is lower than the specified load $T_1$, the high compression end temperature is obtained to ensure the ignitionability in the compression ignition combustion and the combustion stability.

In the range in which the load of the engine 1 is lower than the specified load $T_1$, the ozonator 76 operates in this engine 1 to add ozone to the intake air introduced into the cylinder 18. Introduction of ozone into the cylinder 18 increases the ignitionability of the air-fuel mixture to improve the stability in the compression ignition combustion. As shown in the lower figure of FIG. 7 and FIG. 5, the ozone concentration is constant with respect to the load of the engine 1, while being relatively high at a lower speed and relatively low at a higher speed of the engine. In accordance with the speed level, the ozone concentration may gradually change. For example, the speed range of the engine 1 is divided into a plurality of ranges (e.g., into two of high and low speeds or into three of high, middle, and low speeds). An ozone concentration may be determined for each speed range. Alternatively, the ozone concentration may continuously vary in accordance with the speed level of the engine 1.

Specifically, when the engine 1 operates at a high speed, the amount of heat generated per unit time increases such that the state of temperature in the cylinder 18 is higher than that when the engine 1 operates at a low speed. In order to introduce the hot EGR gas into the cylinder 18, the engine 1 has the negative overlap period. With this configuration, when the engine 1 operates at a high speed, the temperature drop of the exhaust gas decreases more than that at a low speed to raise the compression start temperature and the compression end temperature. In the negative overlap period, the exhaust gas remaining in the cylinder 18 is compressed, and at this time, heat is released through the wall surface of the cylinder 18. This heat release lowers the temperature of the exhaust gas in the cylinder 18, and eventually lowers the compression start temperature and the compression end temperature. However, when the engine 1 operates at a high speed, the actual time per cycle becomes short to hardly cause the heat release described above. This allows for maintaining a high temperature of the exhaust gas. As a result, when the engine 1 operates at a high speed, the compression start temperature and the compression end temperature are higher than when the engine 1 operates at a low speed. When the engine 1 operates at a high speed, the state of temperature in the cylinder is high to easily secure the ignitionability in the compression ignition and the combustion stability. Thus, when the engine 1 operates at a high speed, the ozone concentration is relatively reduced. This allows for securing the ignitionability in the compression ignition and the combustion stability, while reducing the power consumption of the ozonator 76. When the engine 1 operates at a high speed, the intake flow rate per unit time increases. Thus, in order to maintain a high ozone concentration, the power consumption of the ozonator 76 increases. To address the problem, as described above, reduction in the ozone concentration further promotes the advantageous reduction in the power consumption of the ozonator 76, thereby advantageously improving the fuel efficiency. For example, the ozone concentration in a lower speed range may be 12 ppm, and the ozone concentration in a higher speed range, in which the speed is higher than in the lower speed range, may be 10 ppm. The maximum ozone concentration may fall, for example, within a range from about 50 ppm to about 30 ppm.

Regardless of the speed level of the engine 1, the ozone concentration may vary in accordance with the load level of the engine 1. In FIG. 7, when the load of the engine 1 is lower than the specified load $T_1$, ozone is introduced into the cylinder 18. However, the ozone introduction may start at a higher load or lower load than the specified load $T_1$. The operation range for introducing ozone corresponds to a load range lower than the load defined by the dashed-dotted line in FIG. 5. The load defined by the dashed-dotted line may be determined as appropriate.

Other Structures of Valve System

Figure 8:
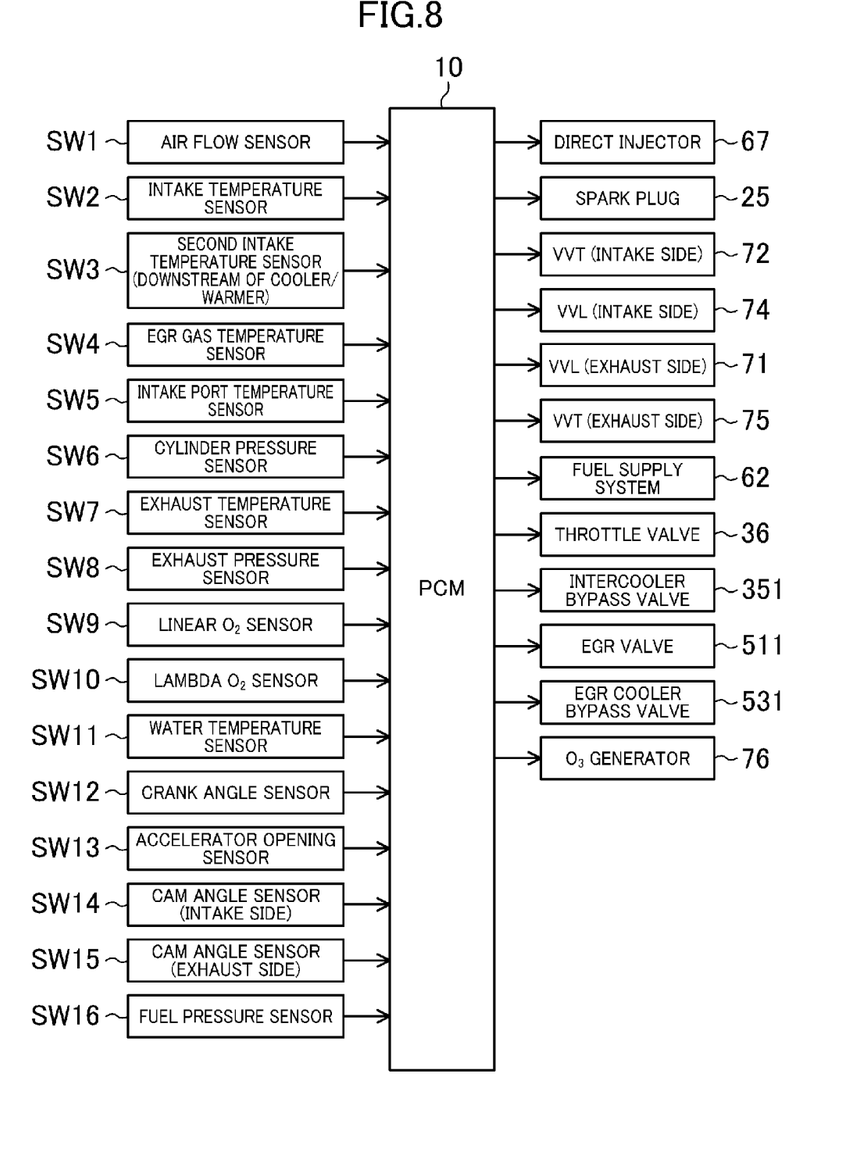
FIG. 8 is a block diagram illustrating the control of a compression ignition engine with a structure different from that of FIG. 2.
Figure 9:
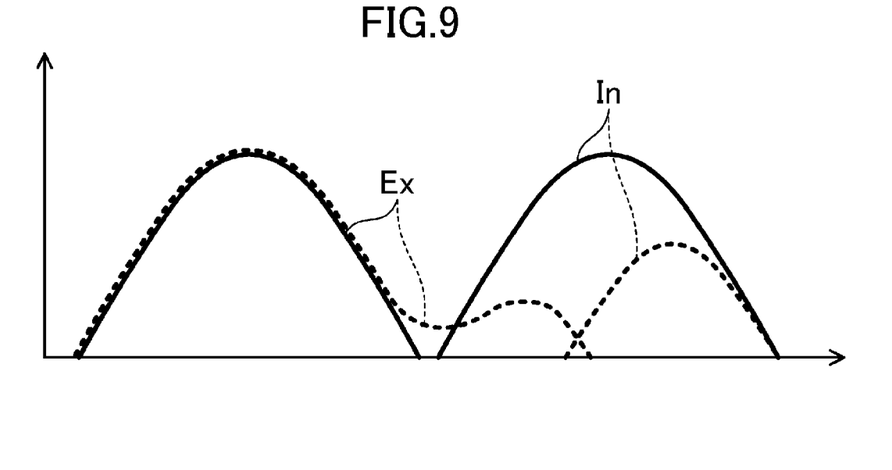
FIG. 9 is a block diagram illustrating example lift curves of intake and exhaust valves. The intake valve is switchable between a large-lift state and a small-lift state. The exhaust valve is switchable between a normal opening operation and a special operation of opening the exhaust valve again in an intake stroke.

FIG. 8 illustrates other structures of the valve system driving the intake and exhaust valves 21 and 22. Specifically, the valve system includes, on the exhaust side, for example, the VVT 75, and a hydraulic operation variable mechanism (hereinafter referred to as a variable valve lift (VVL) mechanism) 71 that switches the operating mode of the exhaust valve 22 between a normal mode and a special mode. Although its structure is not shown in detail, the VVL 71 includes two types of cams with different cam profiles, a first cam with a single cam lobe, and a second cam with two cam lobes, and a lost motion mechanism selectively transmitting the operating mode of one of the first and second cams to the exhaust valve. When the operating mode of the first cam is transmitted to the exhaust valve 22, as represented by the solid line of FIG. 9, the exhaust valve 22 operates in the normal mode to be opened only once in an exhaust stroke. On the other hand, when the operating mode of the second cam is transmitted to the exhaust valve 22, as represented by the broken line of FIG. 9, the exhaust valve 22 operates in the special mode to be opened twice in the exhaust stroke and in an intake stroke. The VVL 71 is switched between the normal mode and the special mode in accordance with the operating mode of the engine.

Like the exhaust valve system including the VVL 71 and the VVT 75, the valve system includes, on the intake side, the VVT 72 and a VVL 74 as shown in FIG. 8. The intake VVL 74 differs from the exhaust VVL 71. The intake VVL 74 includes two types of cams having different cam profiles, a large lift cam relatively increasing the lift amount of the intake valve 21, and a small lift cam relatively decreasing the lift amount of the intake valve 21. The intake VVL 74 also includes a lost motion mechanism selectively transmitting the operating state of one of the large lift cam or the small lift cam to the intake valve 21. When the VVL 74 transmits the operating state of the large lift cam to the intake valve 21, the intake valve 21 is open with a relatively large lift amount as indicated by the solid line in FIG. 9, for a long time. On the other hand, when the VVL 74 transmits the operating state of the small lift cam to the intake valve 21, the intake valve 21 is open with a relatively small lift amount as indicated by the broken line in FIG. 9, for a short time. The large and small lift cams alternate without changing the opening/closing time.

In the engine 1 with this structure, hot EGR gas (i.e., internal EGR gas) is introduced into the cylinder 18 by two-time opening of the exhaust valve. Operating in the special mode, the exhaust VVL 71 is open in an intake stroke as well. This allows for introducing into the cylinder again, part of the exhaust gas that has been discharged to the exhaust port during the exhaust stroke. Such two-time opening of the exhaust valve does not increase cooling losses by compressing the exhaust gas during the exhaust stroke like the structure with a negative overlap period, and reduces temperature drop of the exhaust gas unlike the two-time opening of the intake valve, which discharge exhaust gas to the intake port with a relatively temperature. As a result, the highest gas temperature is obtained at the start of compression. Therefore, employment of the two-time opening of the exhaust valve is advantageous in increasing the compression end temperature, and reduces the overall ozone concentration regardless of the speed level of the engine 1 in the low load range described above.

Although not shown, two-time opening of the intake valve may be employed, in which the intake valve 21 is open in the exhaust stroke to discharge part of exhaust gas to the intake port, and to introduce the discharged exhaust gas together fresh air into the cylinder 18 in the intake stroke.

The technique disclosed herein is not only applicable to the above-described engine. For example, in the intake stroke, the fuel may be injected into the intake port 16 not via the injector 67 in the cylinder 18 but via an extra port injector in the intake port 16.

The engine 1 may contain a $NO_x$ purification catalyst.

The engine 1 is not limited to the straight 4-cylinder engine, but may be a straight 3-cylinder engine, a straight 2-cylinder engine, a straight 6-cylinder engine, etc. The engine 1 may also be various types of engines such as a V6-cylinder engine, a V8-cylinder engine, and a horizontally opposed four-cylinder engine.

The operation control map shown in FIG. 5 is the mere example, and other various maps may be provided.

The high pressure retarded injection may be divided as appropriate. Similarly, the intake stroke injection may be divided as appropriate. In these divided injections, the fuel may be injected in the intake stroke and in the compression stroke.

The geometrical compression ratio of the engine 1 is not limited to the high compression ratio of 15 or higher, and may be lower than 15. As described above, when the engine 1 operates in a low load range, ozone is introduced into the cylinder 18 to secure the ignitionability in the compression ignition and the combustion stability. Therefore, the geometrical compression ratio may be low as long as ozone is introduced into the cylinder 18.

DESCRIPTION OF REFERENCE CHARACTERS

1 Engine (Engine Body)
10 PCM (Controller)
18 Cylinder
21 Intake Valve
22 Exhaust Valve
50 EGR Passage (External EGR System)
51 Main Passage (External EGR System)
511 EGR Valve (External EGR System)
52 EGR Cooler (External EGR System)
67 Injector (Fuel Injection Valve)
71 (Exhaust) VVL (Internal EGR System)
72 (Intake) VVT (Internal EGR System)
74 (Intake) VVL (Internal EGR System)
75 (Exhaust) VVT (Internal EGR System)
76 Ozonator

The invention claimed is:
1. A control device for a compression ignition engine, the control device comprising:
   an engine body including a cylinder;
   a fuel injection valve configured to directly inject fuel into the cylinder;
   an ozonator configured to generate ozone to be introduced into the cylinder; and
   a controller configured to operate the engine body by compression ignition combustion of an air-fuel mixture in the cylinder when the engine body operates in a predetermined compression ignition range, wherein
   when the engine body operates in a low load range with a load lower than a predetermined load in the compression ignition range, the controller sets a time of fuel injection with the fuel injection valve in a first half of a compression stroke or earlier, and allows the ozonator to introduce the ozone into the cylinder, and
   when the engine body operates in the low load range, the controller controls an ozone concentration to be lower at a higher speed than at a low speed.

2. The control device of claim 1, further comprising:
an internal EGR system configured to recirculate exhaust gas into the cylinder by controlling opening and closing of intake and exhaust valves of the engine body, wherein
when the engine body operates in the low load range, the controller allows the internal EGR system to recirculate the exhaust gas into the cylinder, and sets an EGR ratio, which is a ratio of an amount of the exhaust gas to an entire amount of gas in the cylinder, to be higher than or equal to a predetermined value.

3. The control device of claim 2, wherein
the internal EGR system adjusts a closing time of at least the exhaust valve to provide a period of closing both the exhaust and intake valves across an exhaust top dead center, thereby recirculating the exhaust gas into the cylinder.

4. The control device of claim 2, wherein
the internal EGR system is configured to recirculate the exhaust gas into the cylinder, by opening the exhaust valve while the intake valve is open in an intake stroke, or by opening the intake valve while the exhaust valve is open in an exhaust stroke.

5. The control device of claim 2, further comprising:
an external EGR system configured to recirculate the exhaust gas with a temperature lower than that of the internal EGR system into the cylinder via an EGR passage connecting exhaust and intake passages of the engine body, wherein
when the engine body operates in a high load range with the load higher than or equal to the predetermined load in the compression ignition range, the controller allows at least the external EGR system to recirculate low-temperature exhaust gas into the cylinder.

6. The control device of claim 3, further comprising:
an external EGR system configured to recirculate the exhaust gas with a temperature lower than that of the internal EGR system into the cylinder via an EGR passage connecting exhaust and intake passages of the engine body, wherein
when the engine body operates in a high load range with the load higher than or equal to the predetermined load in the compression ignition range, the controller allows at least the external EGR system to recirculate low-temperature exhaust gas into the cylinder.

7. The control device of claim 4, further comprising:
an external EGR system configured to recirculate the exhaust gas with a temperature lower than that of the internal EGR system into the cylinder via an EGR passage connecting exhaust and intake passages of the engine body, wherein
when the engine body operates in a high load range with the load higher than or equal to the predetermined load in the compression ignition range, the controller allows at least the external EGR system to recirculate low-temperature exhaust gas into the cylinder.

* * * * *